(12) United States Patent
Coblentz et al.

(10) Patent No.: US 10,817,858 B2
(45) Date of Patent: Oct. 27, 2020

(54) ADD-IN DIGITAL RIGHTS MANAGEMENT

(75) Inventors: David Coblentz, San Jose, CA (US);
Annie Carnie, Carnation, WA (US)

(73) Assignee: Adobe Inc., San Jose, CA (US)

(*) Notice: Subject to any disclaimer, the term of this patent is extended or adjusted under 35 U.S.C. 154(b) by 2326 days.

(21) Appl. No.: 12/184,129

(22) Filed: Jul. 31, 2008

(65) Prior Publication Data
US 2014/0250536 A1 Sep. 4, 2014

(51) Int. Cl.
*G06Q 20/12* (2012.01)
*G06F 21/62* (2013.01)
*G06F 21/10* (2013.01)

(52) U.S. Cl.
CPC ......... *G06Q 20/1235* (2013.01); *G06F 21/10* (2013.01); *G06F 21/629* (2013.01)

(58) Field of Classification Search
USPC .......................................................... 726/27
See application file for complete search history.

(56) References Cited

U.S. PATENT DOCUMENTS

| | | | |
|---|---|---|---|
| 5,629,980 A * | 5/1997 | Stefik et al. ................. 705/54 |
| 7,386,835 B1 * | 6/2008 | Desai et al. ................. 717/117 |
| 2002/0108050 A1 * | 8/2002 | Raley ..................... G06F 21/10 713/193 |
| 2006/0184915 A1 * | 8/2006 | DeGroote et al. ............ 717/106 |
| 2007/0055936 A1 * | 3/2007 | Dhanjal ................ G06F 17/227 715/700 |
| 2007/0061427 A1 * | 3/2007 | Vishnia-Shabtai et al. .. 709/220 |
| 2008/0141334 A1 | 6/2008 | Wicker et al. |

OTHER PUBLICATIONS

Microsoft Press Dictionary 3rd Edition.*
"Component Object Model", Wikipedia, http://en.wikipedia.org/wiki/Component_Object_Model, article retrieved on Jul. 31, 2008, 17 pages.

* cited by examiner

*Primary Examiner* — Zeshan Qayyum
(74) *Attorney, Agent, or Firm* — Kilpatrick Townsend & Stockton LLP (57) ABSTRACT

The subject matter disclosed herein relates to regulating the operation of component object model add-ins associated with a user interface.

16 Claims, 5 Drawing Sheets

ADD-IN DIGITAL RIGHTS MANAGEMENT

BACKGROUND

The effective management and control of digital content is becoming increasingly important as the volume of such content proliferates. Digital Rights Management (DRM) typically refers to a number of technologies used to enforce pre-defined policies for controlling access to digital data or content. Typically, DRM handles the monitoring and enforcement of usage restrictions that may accompany a specific instance (or item) of digital content.

Various DRM technologies may be available to protect a variety of different types of digital content. For example, the Portable Document Format (PDF) is an open standard file format, developed by Adobe Systems Incorporated, of San Jose Calif., that may provide a capability to controlling access to digital content.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

FIG. 5 is a schematic diagram of a ribbon-type graphical user interface in accordance with one or more embodiments Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some exemplary methods and systems are described herein that may be used for digital rights management. As will be described in greater detail below, certain exemplary embodiments described herein may relate to regulating the operation of component object model (COM) add-ins associated with a user interface. For example, such regulation may comprise parsing an XML resource associated with a component object model add-in that extends a user interface and determines whether a command associated with the component object model add-in comprises a limited operation.

Figure 5:
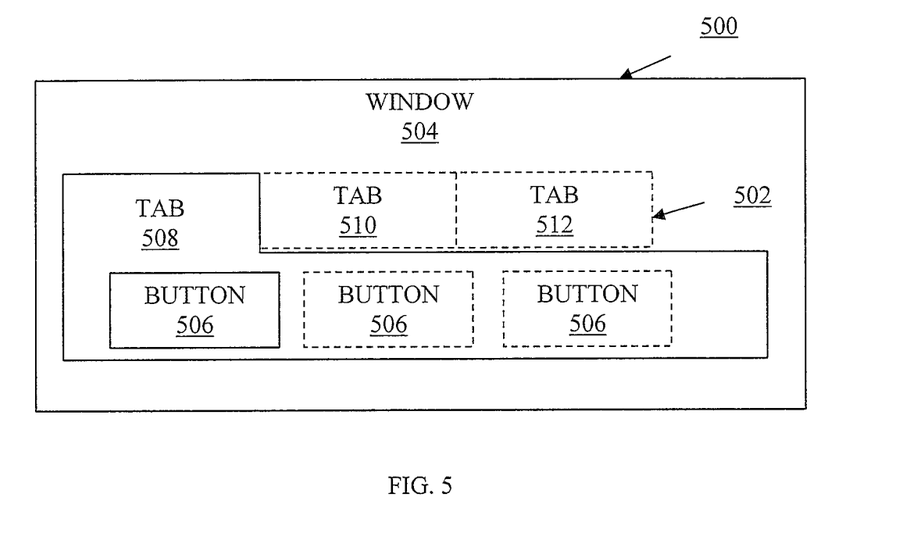

Such a user interface may be utilized by a user to access one or more electronic documents. As used herein, the term "user interface" may include a program capable of presenting portions of one or more electronic documents to a user. Some user interfaces, such as Microsoft® Word 2007, and/or the like, may utilize a ribbon-type interface. Referring to FIG. 5, such a "ribbon" may refer to a ribbon-type graphical user interface (GUI) widget 500 comprising a strip 502 across the top of the window 504 that exposes a plurality of buttons 506 and/or menus associated with various functions that the user interface can perform. In a particular implementation, such a ribbon-type graphical user interface 500 may contain a plurality of tabs 508-512 listed in a row at the top of GUI 500. One example of such a ribbon-type graphical user interface may be an Office 2007 Fluent User Interface. However, the scope of claimed subject matter is not limited in this respect.

As used herein, the term "electronic document" may include any information in a digital format that may be perceived by a user if displayed by a digital device, such as, for example, a computing platform. For one or more embodiments, an electronic document may comprise an electronic document formatted for Microsoft® Office applications such as Microsoft® Word, Microsoft® Excel, Microsoft® PowerPoint, other Microsoft® Office applications, and/or the like and/or applications developed by providers other than Microsoft Inc. However, the scope of claimed subject matter is not limited in this respect.

A user interface may be extended by one or more component object model add-ins. As used herein the term "extend a user interface," or the like, may refer to modifications associated with a user interface that may alter preexisting functional operations and/or add new functional operations within such a user interface, where such alterations and/or additions may optionally be graphically represented within the user interface. In a particular implementation, a COM may refer to an interface standard for software componentry. For example, it may be possible to design a single COM add-in that may available to two or more Microsoft® Office applications such as Microsoft® Word, Microsoft® Excel, Microsoft® PowerPoint, other Microsoft® Office applications, and/or the like, and/or applications developed by providers other than Microsoft Inc. Such COM add-ins may link to library resources, such as a dynamic link library (DLL), in order to generate and/or extend a given user interface. Accordingly, a user interface may include a program that is compatible with COM add-ins such as Microsoft® Word, Microsoft® Excel, Microsoft® PowerPoint, other Microsoft® Office applications, and/or the like, and/or applications developed by providers other than Microsoft Inc.

Given an action of a user, certain functions within a given COM add-in may be executed within an associated user interface. For example, COM add-ins may access a DLL resource through an associated user interface. Such an associated user interface may load a COM add-in and then may drive the operation of the COM add-in. By accessing a given user interface, a user may execute or drive certain functions associated with a COM add-in.

A plurality of COM add-ins may be associated with a given user interface. Some COM add-ins may be installed while other COM add-ins may not be installed. A given COM add-in may add a tab to a ribbon of a given GUI. For example, in cases where such a GUI comprises a ribbon-type interface 500, a given COM add-in may add a tab 510 to a strip 502. Additionally or alternatively, a given COM add-in may add a button to another preexisting tab in a GUI. For example, a given COM add-in may add a button 506 to another preexisting tab 508 in ribbon-type interface 500. Accordingly, a given COM add-in may add buttons to the COM add-in's own tab or add buttons to a preexisting tab in a GUI. However, a given COM add-in may not have access to alter a tab associated with a secondary COM add-in, unless cooperation is specifically provided for between the two COM add-ins. For example, a given COM add-in may not have access to alter a tab 512 associated with a secondary COM add-in, unless cooperation is specifically provided for between the two COM add-ins. Similarly, a given COM add-in may govern the operation of buttons associated with the COM add-in's own associated tab in a ribbon of a given user interface. Likewise, a given COM add-in may govern the operation of buttons associated with a preexisting tab in a GUI.

In cases where there is a plurality of COM add-ins, more than one COM add-in may be associated with a given limited operation. For example, where two different COM add-ins attempt to enable or disable a given limited operation, a COM add-in which disables the given limited operation may take precedence over a different COM add-in that tries to enable the given limited operation. In such a case, the order in which COM add-ins are loaded may not change the behavior of a given limited operation. However, in some cases, rather than enable or disabling a given limited operation, a COM add-in may attempt to "repurpose" the actual behavior of a given limited operation. Such a "repurposing," as referred to herein, may refer to changing the actual behavior of a given limited operation so as to be modified by specifying a different procedure that may be executed when such a given limited operation is accessed. In such a case, two COM add-ins may not repurpose the same given limited operation at the same time. Instead, the last COM add-in to be loaded may be the COM add-in which will successfully repurpose the given limited operation. In such a case, the last COM add-in, from among the plurality of COM add-ins, to be loaded by a GUI may be the only COM add-in to be associated with the given limited operation. Such a limited operation may refer to a functional operation of a GUI that relates to digital rights management, such as a "save" function, a "save as" function, a "copy" function, and/or the like. In digital rights management, it might be desired for a primary COM add-in capable of digital rights management to be able to repurpose a save function-type limited operation associated with the preexisting user interface and/or associated with a secondary COM add-in. However, where a primary COM add-in capable of digital rights management is not loaded last by a GUI, the primary COM add-in may not have priority over governing the save function-type limited operation. So, for example, a save function-type limited operation could be intended to be repurposed via a primary COM add-in, but might instead be repurposed via a secondary COM add-in. Accordingly, enforcing certain rights may be curtailed by operation of such secondary COM add-ins. Additionally, such a primary COM add-in that has been preempted by a secondary COM add-in may not recognize that the primary COM add-in has been preempted and is no longer fully functional for governing digital rights management.

Figure 1:
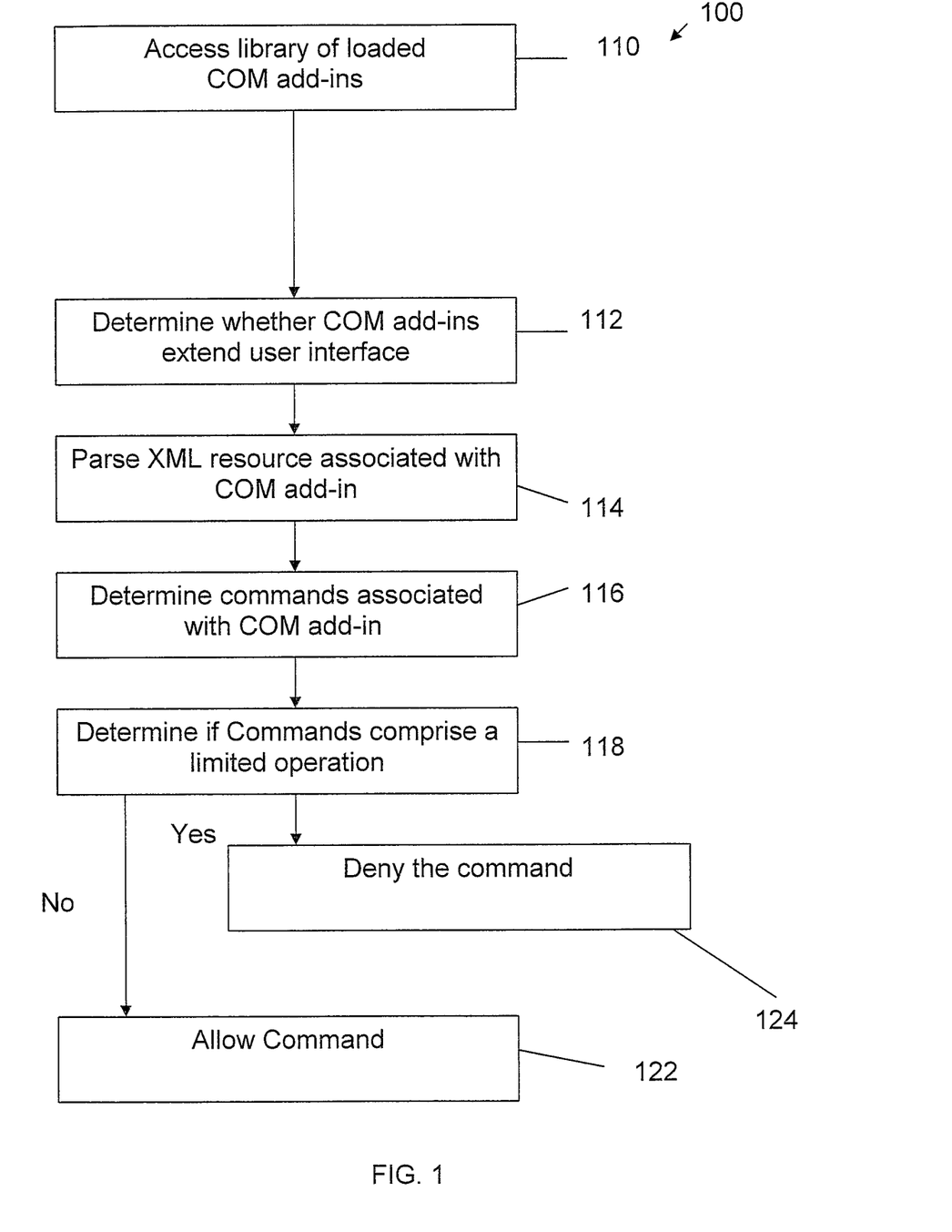
FIG. 1 is a flow diagram illustrating a procedure for regulating the operation of component object model add-ins associated with a user interface in accordance with one or more embodiments.

Referring to FIG. 1, a flow diagram illustrates an example procedure in accordance with one or more embodiments, although the scope of claimed subject matter is not limited in this respect. Procedure 100 illustrated in FIG. 1 may be used to regulate the operation of COM add-ins associated with a GUI, for example, although the scope of claimed subject matter is not limited in this respect. Additionally, although procedure 100, as shown in FIG. 1, comprises one particular order of blocks, the order in which the blocks are presented does not necessarily limit claimed subject matter to any particular order. Likewise, intervening blocks shown in FIG. 1 and/or additional blocks not shown in FIG. 1 may be employed and/or blocks shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. Procedure 100 may comprise a computer executable procedure associated with a COM add-in. For example, such a procedure may add a tab to the ribbon of a GUI. Further, such a procedure may impact limited operations in a GUI that may or may not be part of the COM add-in, but that may be desired to set properties for. For instance, for a file "save" command-type limited operation, a "get-enabled" callback function may operate so as to enable such a file "save" command-type limited operation to be executable. Such a file "save" command-type limited operation may then be overwritten with an "on action" callback function via procedure 100, as discussed in greater detail below with respect to block 124.

As used herein, the term "callback" may refer to executable code that allows a lower-level software layer to call a subroutine and/or limited operation defined in a higher-level software layer. For example, a get-enabled-type callback may be utilized within a lower-level software layer of a COM add-in if enabling certain limited operations in a higher-level software layer of a GUI. Similarly, an on-action-type callback may be utilized within a lower-level software layer of a COM add-in if accessing and/or controlling certain limited operations in a higher-level software layer of a GUI. As discussed above, such limited operations may include, for example, a "save" function, a "save as" function, a "copy" function, and/or the like.

In some cases there may be two or more COM add-ins that specify an on-action-type callback for a single limited operation, such as file "save". In such a situation, a first COM add-in capable of digital rights management will be referred to herein as a "primary COM add-in" and a second COM add-in that may be subjugated to such a primary COM add-in will be referred to herein as a "secondary COM add-in". For instance, only one of the two or more COM add-ins may be triggered with a given limited operation. During regular operation of a GUI it may be the case that the last COM add-in to be loaded will be the only COM add-in to be associated with a limited operation, such as file "save". Accordingly, during regular operation of a GUI there may be no way to guarantee that a callback is actually going to be called for a given COM add-in. Additionally, not only may the callback from a given COM add-in not be called, such a given COM add-in may not be aware that the callback was not called. So, there may be no way to tell whether a given callback associated with a given COM add-in is still valid or if it has been overwritten. As discussed above, a particular callback for which a COM add-in is enabled may depend on an order of load of the multiple COM add-ins. Additionally, it may not be possible to guarantee that a given COM add-in is loaded last, to thereby give such a COM add-in priority.

As illustrated, procedure 100 may be used to regulate the operation of COM add-ins associated with a GUI. Procedure 100 may be used to regulate the operation of COM add-ins starting at block 110 where a library of one or more loaded COM add-ins may be accessed. For example, procedure 100 may inspect a list of COM add-ins and may identify COM add-ins based on Globally Unique Identifiers (GUIDs) associated with each COM add-in. In a particular implementation, such COM add-ins may be identified by a GUI via class IDs (CLSIDs), which may comprise GUIDs. Similarly, different user interfaces supported by a COM add-in may be distinguished from each other using interface IDs (IIDs), which may also comprise GUIDs. For example, COM add-ins may be listed by GUIDs in a registry.

Block 112 may determine whether at least one COM add-in extends a given user interface. For example, a COM add-in may have an associated XML resource. As used herein the term "XML resource" may refer to a portion of Extensible Markup Language associated with a COM add-in that govern the interaction of such a COM add-in with an associated GUI. In situations where a COM add-in has XML resources that it wants to load, the COM add-in may have a GUID associated with a DLL. Based on the identified COM add-ins, procedure 100 may attempt to load the identified COM add-ins to access the DLL of the identified COM add-ins. Procedure 100 may look to see which loaded COM add-ins have any XML resources that extend a given user interface. In instances where a given user interface comprises a ribbon-type interface, procedure 100 may look to see which COM add-ins have any XML resources for a ribbon-type interface to determine whether a given user interface is extended.

At block 114 an XML resource may be parsed. Such an XML resource may be associated with at least one of the COM add-ins that extends a GUI. For example, where a given COM add-in extends a given user interface, associated XML resources may be retrieved and parsed by procedure 100. In cases where a user interface comprises a ribbon-type interface, such parsing of an XML resource may specify a layout of ribbon-type interface.

At block 116 a determination may be made of one or more commands associated with at least one of the COM add-ins that extend a GUI. At block 118 a determination may be made whether the one or more commands comprise a limited operation. Such a determination of whether the command comprises a limited operation may include determining whether the command is one operation of a plurality of operations contained in a library of operations. As discussed above, such a limited operation may refer to a functional operation of a GUI that relates to digital rights management, such as a "save" function, a "save as" function, a "copy" function, and/or the like. For example, procedure 100 may determine whether parsed XML resources contain any limited operations of concern. Such a determination may be made as to whether a given XML resource sets an on-action-type callback for a button/function of concern. For example, a limited operation may comprise an on action-type callback for a security type operation, a digital rights management operation, and/or any combination thereof.

At block 122 the command may be passed to an operating system. For example, in cases where the command is not a limited operation, such a command may be passed to the operating system for execution.

Alternatively, at block 124 the command may be denied based at least in part on the determination. For example, in cases where a command associated with a secondary COM add-in is a limited operation, such a command may be overridden disabling the associated COM add-in. For example, in cases where a command associated with a secondary COM add-in is a limited operation, then a remedial solution may be applied to the potential problem to rectify the situation. Procedure 100 may hook back based on an individual on action-type callback associated with a given limited operation of concern. Procedure 100 may determine when such a secondary on action-type callback is called and may add a remedial action to override the particular action of the secondary COM add-in. For example, such a remedial measure may be disabling the secondary COM add-in, so that all or some of the functionalities previously enabled by the secondary COM add-in are no longer available. Such overriding of a command associated with a secondary COM add-in may be possible where procedure 100 has Administrative Access on a given computing platform. Additionally or alternatively, procedure 100 may give a warning message indicating that activation of such a limited operation may violate digital rights management, and/or the like.

During operation, procedure 100 may detect when any COM add-in operates a specific command for a limited operation. Procedure 100 may implement a function in a DLL and such a GUI may call procedure 100 so that any instance of such a limited operation (such as a save button located at multiple locations within a GUI) may trigger procedure 100. Accordingly, a GUI may read through the XML of a given COM add-in and recognize that a given limited operation is associated with the present procedure 100 and call the procedure 100 if such a limited operation is accessed. For example, a file "save" command-type limited operation may be accessed (such as by clicking on a file "save" button in a GUI). In such a case, procedure 100 may utilize an on-action-type callback function and may trigger a primary COM add-in to be called back first so that intervening operations may be executed prior to executing the file "save" command. For example, procedure 100 may countermand such a file "save" command and/or the file "save" command could be executed in some alternative arrangement. For example, procedure 100 may set a "get enabled" operability, so as to grey out (in the appearance of a GUI) a given command. In such a case, multiple instances of the given command in multiple locations in a GUI (but possibly not in a secondary COM add-in itself) may be equally effected so as to automatically follow the rules proscribed by procedure 100. So effectively, procedure 100 may overwrite buttons in a GUI to grey them out.

Additionally or alternatively, a remedial measure may comprise disabling the entire COM add-in. For example, a secondary COM add-in may be disabled via a primary COM add-in capable of digital rights management. Such disabling of a secondary COM add-in may be possible where procedure 100 has Administrative Access on a given computing platform.

Figure 2:
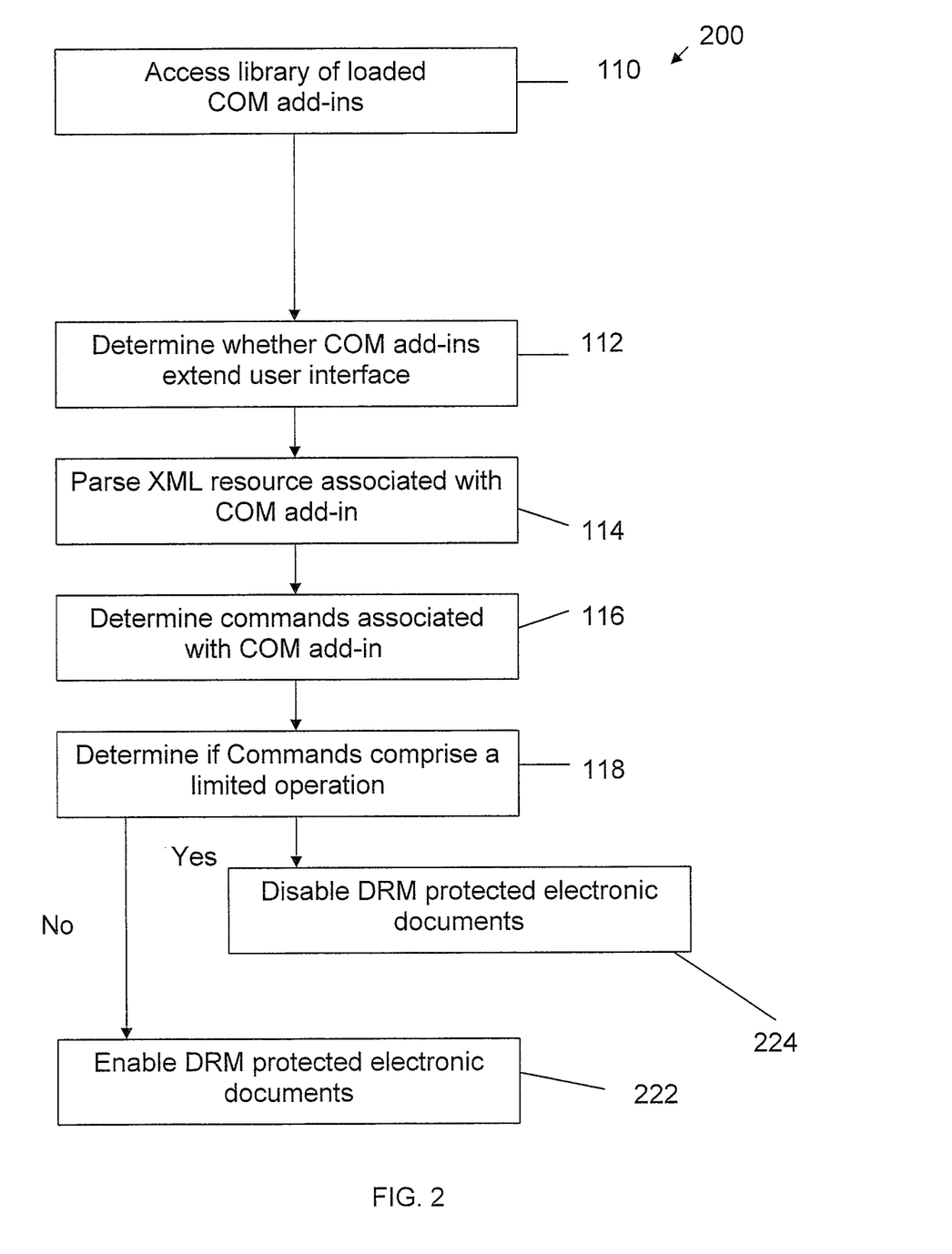
FIG. 2 is a flow diagram illustrating a procedure for regulating the operation of component object model add-ins associated with a user interface in accordance with one or more embodiments.

Procedure 200 depicted in FIG. 2 may be similar to procedure 100 in certain respects. Accordingly, like numerals in procedure 200 may designate like operation throughout to indicate corresponding or analogous elements of procedure 100, and will not be further described herein Procedure 200, in addition or in the alternative to procedure 100, may prevent the loading of any protected electronic documents. At block 222 a digital rights management protected electronic document may be enabled based at least in part on the determination of whether the one or more commands comprise a limited operation. For example, in cases where the command is not a limited operation, such a digital rights management protected electronic document may be enabled.

At block 224 a digital rights management protected electronic document may be disabled based at least in part on the determination of whether the one or more commands comprise a limited operation. For example, in cases where the command is not a limited operation, such a digital rights management protected electronic document may be disabled. For example, such disabling may include controlling and/or preventing access to a digital rights management protected electronic document.

Figure 3:
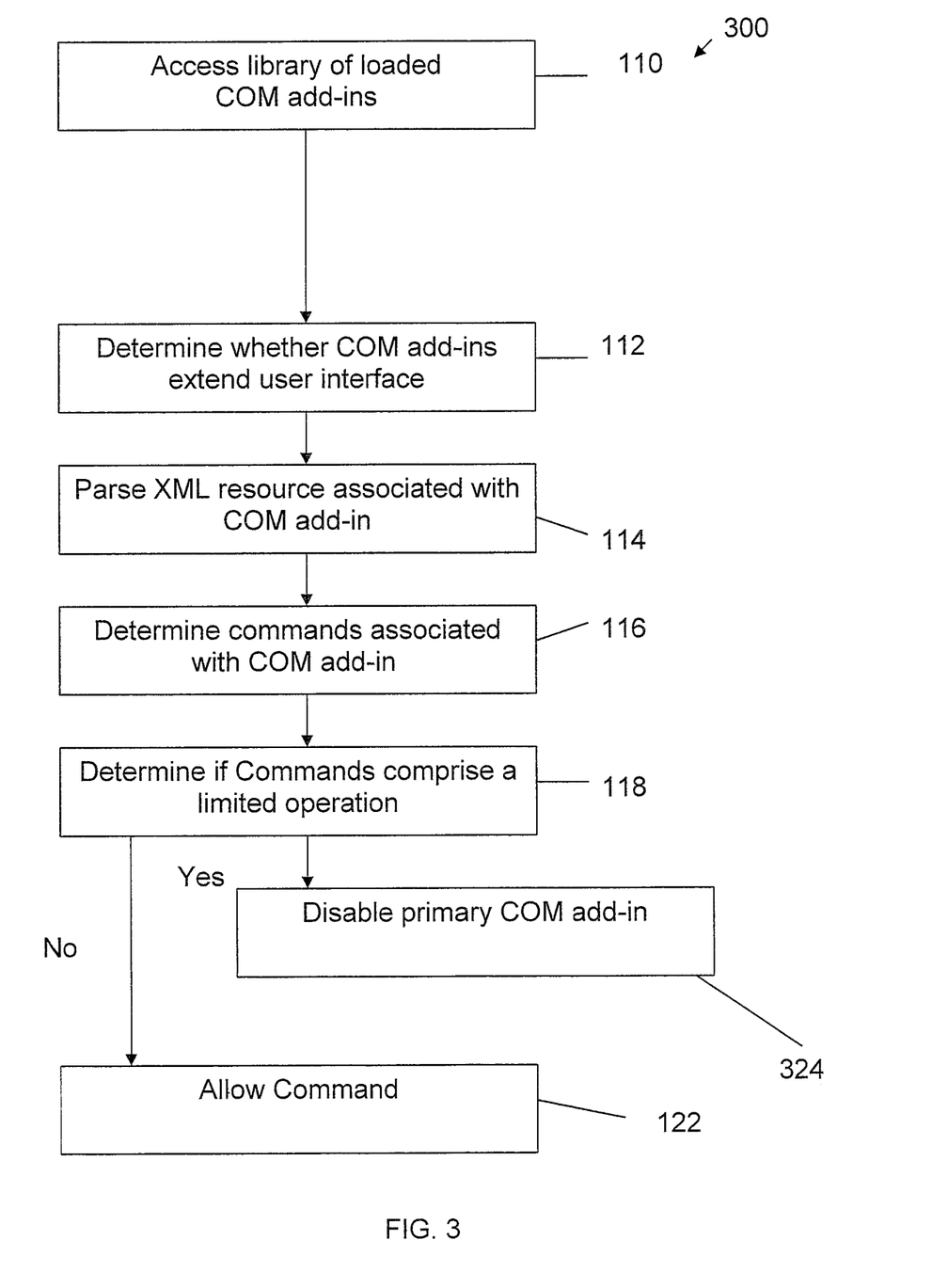
FIG. 3 is a flow diagram illustrating a procedure for regulating the operation of component object model add-ins associated with a user interface in accordance with one or more embodiments.

Procedure 300 depicted in FIG. 3 may be similar to procedure 100 in certain respects. Accordingly, like numerals in procedure 300 may designate like operation throughout to indicate corresponding or analogous elements of procedure 100, and will not be further described herein Procedure 300, in addition or in the alternative to procedures 100 and/or 200, may limit the operation of a primary COM add-in. At block 324 at least a portion of a primary COM add-in may be disabled based at least in part on the determination of whether the one or more commands comprise a limited operation. For example, in cases where the command is not a limited operation, all or portions of a primary COM add-in capable of digital rights management may be disabled. Accordingly, remedial measures may include disabling a primary COM add-in capable of digital rights management, so that all or some of the functionalities previously enabled by the primary COM add-in are no longer available. For example, disabling a primary COM add-in capable of digital rights management may be made based on a determination that disabling a secondary COM add-in may not be possible.

In operation, procedures 100, 200, and/or 300, alone or in combination, may determine whether there are secondary COM add-ins that may create a problem for digital rights management. For example, XML resources may be obtained from such secondary COM add-ins and analyzed to determine if such secondary COM add-ins may compromise digital rights management. Procedures 100, 200, and/or 300, alone or in combination, may enact one or more remedial measures with respect to such secondary COM add-ins, a primary COM add-in capable of digital rights management, and/or with respect to digital rights management protected electronic documents.

Figure 4:
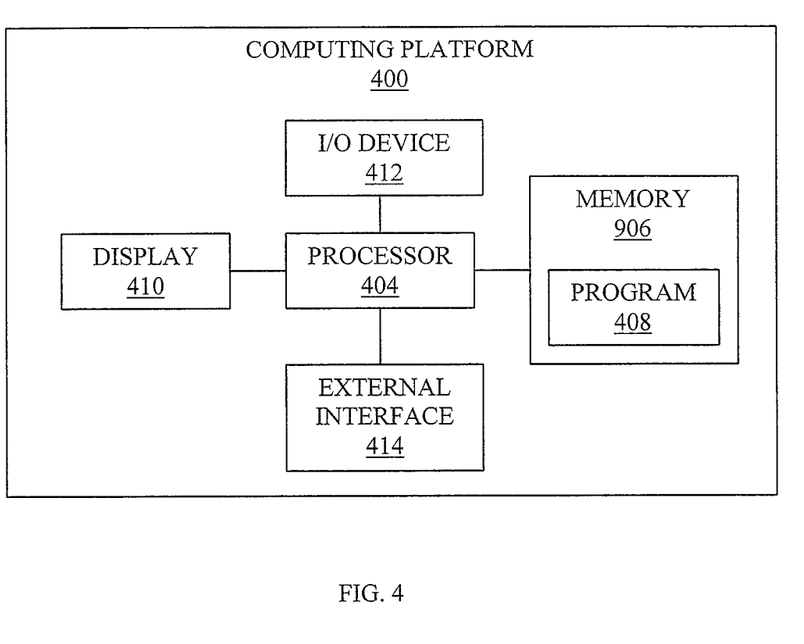
FIG. 4 is a schematic diagram of a computing platform in accordance with one or more embodiments.

Referring to FIG. 4, a block diagram illustrates a computing platform 400 according to one or more embodiments, although the scope of claimed subject matter is not limited in this respect. Computing platform 400 may include more and/or fewer components than those shown in FIG. 4. However, generally conventional components may not be shown, for example, a battery, a bus, and so on.

Computing platform 400 may include one or more devices configurable to regulate the operation of COM add-ins associated with a user interface using one or more techniques illustrated above, for example. Computing platform 400, as shown in FIG. 4, may be utilized to tangibly embody a computer program and/or graphical user interface by providing hardware components on which the computer program and/or graphical user interface may be executed. Computing platform 400 may be utilized to tangibly embody all or a portion of procedure 100 of FIG. 1, procedure 200 of FIG. 2, and/or procedure 300 of FIG. 3. In certain implementations, computing platform 400 may be configurable regulating the operation of COM add-ins associated with a user interface using one or more techniques illustrated above. For example, a process may be applied in computing platform 400 where XML resources may be obtained from secondary COM add-ins and analyzed to determine if such secondary COM add-ins may compromise digital rights management. Procedures 100, 200, and/or 300, alone or in combination, may be applied in computing platform 400 in order to enact one or more remedial measures with respect to such secondary COM add-ins, a primary. COM add-in capable of digital rights management, and/or with respect to digital rights management protected electronic documents.

Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 4, computing platform 400 may be controlled by processor 404, including one or more auxiliary processors (not shown). Processor 404 may comprise a central processing unit such as a microprocessor or microcontroller for executing programs, performing data manipulations, and controlling the tasks of computing platform 400. Auxiliary processors may manage input/output, perform floating point mathematical operations, manage digital signals, perform fast execution of signal processing algorithms, operate as a back-end processor and/or a slave-type processor subordinate to processor 404, operate as an additional microprocessor and/or controller for dual and/or multiple processor systems, and/or operate as a coprocessor and/or additional processor. Such auxiliary processors may be discrete processors and/or may be arranged in the same package as processor 404, for example, in a multicore and/or multi-threaded processor; however, the scope of claimed subject matter is not limited in these respects.

Communication with processor 404 may be implemented via a bus (not shown) for transferring information among the components of computing platform 400. A bus may include a data channel for facilitating information transfer between storage and other peripheral components of computing platform 400. A bus further may provide a set of signals utilized for communication with processor 404, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 400 may include, for example, memory 406, including one or more auxiliary memories (not shown). Memory 406 may provide storage of instructions and data for one or more programs 408 to be executed by processor 404, such as all or a portion of procedure 100 of FIG. 1, procedure 200 of FIG. 2, and/or procedure 300 of FIG. 3, for example. Memory 406 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 406 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 406 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 400 further may include a display 410. Display 410 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 410 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 400 further may include one or more I/O devices 412. I/O device 412 may comprise one or more I/O devices 412 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 400 further may include an external interface 414. External interface 414 may comprise one or more controllers and/or adapters to prove interface functions between multiple I/O devices 412. For example, external interface 414 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 412.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter.

While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
   performing by a computer:
   during operation of a graphical user interface, regulating operation of a primary component object model add-in for an electronic document and a secondary component object model add-in, wherein said regulating comprises subjugating, based on the primary component object model add-in governing digital rights management of the electronic document, the second component object model add-in to the primary component model add-in, wherein subjugating the secondary component object model comprises:
   determining that a resource associated with the secondary component object model add-in extends the graphical user interface;
   in response to determining that the resource associated with the secondary component object model add-in extends the graphical user interface, determining that the resource alters a pre-existing functional operation that is executable within the graphical user interface, the pre-existing functional operation comprising a command in the graphical user interface;
   in response to determining that the resource associated with the secondary component object model add-in extends the graphical user interface, determining that the command comprises a limited operation to which the digital rights management governed by the primary component object model add-in pertains; and
   in response to determining that the command comprises the limited operation, applying a remedial action that comprises at least one of denying the command, disabling a document to which the command is targeted, or disabling the secondary component object model add-in.

2. The method of claim 1, further comprising:
   denying activation of said pre-existing functional operation based at least in part on determining whether said preexisting functional operation is a limited functional operation whose activation violates digital rights management.

3. The method of claim 1, wherein:
   applying the remedial action is performed by the primary component object model add-in.

4. The method of claim 1, further comprising:
   disabling a digital-rights-management-protected electronic document to which said pre-existing functional operation is targeted based at least in part on determining whether said pre-existing functional operation is a limited operation whose activation violates digital rights management.

5. The method of claim 1, wherein said determining whether the command comprises a limited operation for which digital rights management pertains includes determining whether the command comprises one of a plurality of operations contained in a library of operations.

6. The method of claim 1, wherein the limited operation comprises an on-action-type callback for a security-type operation.

7. The method of claim 1, wherein subjugating the secondary component object model further comprises:
   parsing an additional resource associated with the secondary component object model add-in;
   determining that the additional resource extends the graphical user interface and alters a pre-existing functional operation that is executable within the graphical user interface, the pre-existing functional operation comprising an additional command in the graphical user interface;
   in response to determining that the additional resource extends the graphical user interface, determining that the additional command does not comprise a limited operation to which the governed digital rights management pertains; and
   in response to determining that the additional command does not comprise a limited operation, passing the additional command to an operating system for execution.

8. The method of claim 1, wherein the graphical user interface comprises a ribbon-type graphical user interface, and the method further comprises parsing an XML resource associated with each of the one or more component object model add-ins that specifies a layout of the ribbon-type graphical user interface.

9. A system, comprising:
   a processor; and
   a memory coupled to the processor, wherein the memory stores program instructions that when executed by the processor perform:
   during operation of a graphical user interface, regulating operation of a primary component object model add-in for an electronic document and a secondary component object model add-in, wherein said regulating comprises subjugating, based on the primary component object model add-in governing digital rights management of the electronic document, the second component object model add-in to the primary component model add-in, wherein subjugating the secondary component object model comprises:
   determining that a resource associated with the secondary component object model add-in extends the graphical user interface;
   in response to determining that the resource associated with the secondary component object model add-in extends the graphical user interface determining that the resource alters a pre-existing functional operation that is executable within the graphical user interface, the pre-existing functional operation comprising a command in the graphical user interface;
   in response to determining that the resource associated with the secondary component object model add-in extends the graphical user interface, determining that the command comprises a limited operation to which the digital rights management governed by the primary component object model add-in pertains; and
   in response to determining that the command comprises the limited operation, applying a remedial action that comprises at least one of denying the command, disabling a document to which the command is targeted, or disabling the secondary component object model add-in.

10. The system of claim 9, wherein the program instructions comprise the primary component object model and are further executable to perform:

applying the remedial action by the primary component object model add-in.

11. The system of claim 9, wherein the program instructions are further executable to perform:
   disabling a digital-rights-management-protected electronic document to which said pre-existing functional operation is targeted based at least in part on determining whether said command is a limited operation whose activation violates digital rights management.

12. The system of claim 9, wherein the program instructions are further executable to perform:
   in response to determining that the resource associated with the secondary component object model add-in includes a command that does not comprise a limited operation for which digital rights management pertains, passing the command that does not comprise a limited operation for which digital rights management pertains to an operating system for execution;
   wherein said determining whether the command comprises a limited operation for which digital rights management pertains includes determining whether the command comprises one of a plurality of operations contained in a library of operations;
   wherein the limited operation comprises at least one of an on-action-type callback for a security-type operation and a digital rights management operation.

13. A non-transitory computer-readable storage medium storing program instructions that when executed by a computer perform:
   during operation of a graphical user interface, regulating operation of a primary component object model add-in for an electronic document and a secondary component object model add-in, wherein said regulating comprises subjugating, based on the primary component object model add-in governing digital rights management of the electronic document, the second component object model add-in to the primary component model add-in, wherein subjugating the secondary component object model comprises:
   determining that a resource associated with the secondary component object model add-in extends the graphical user interface;
   in response to determining that the resource associated with the secondary component object model add-in extends the graphical user interface, determining that the resource alters a pre-existing functional operation that is executable within the graphical user interface, the pre-existing functional operation comprising a command in the graphical user interface;
   in response to determining that the resource associated with the secondary component object model add-in extends the graphical user interface, determining that the command comprises a limited operation to which the digital rights management governed by the primary component object model add-in pertains; and
   in response to determining that the command comprises the limited operation, applying a remedial action that comprises at least one of denying the command, disabling a document to which the command is targeted, or disabling the secondary component object model add-in.

14. The medium of claim 13, wherein the program instructions are further executable to perform:
   denying activation of said pre-existing functional operation based at least in part on determining whether said command comprises a limited operation whose activation violates digital rights management.

15. The medium of claim 13, wherein the program instructions comprise the primary component object model and are further executable to perform:
   applying the remedial action by the primary component object model add-in.

16. The medium of claim 13, wherein the program instructions are further executable to perform:
   disabling a digital-rights-management-protected electronic document to which said command is targeted based at least in part on determining whether said command is a limited operation whose activation violates digital rights management.

* * * * *